Jan. 16, 1968     R. W. FREYTAG     3,364,474
FERROACOUSTIC MEMORY DELAY LINE EMPLOYING REFLECTED STRAIN
WAVES FOR IMPROVED SIGNAL-TO-NOISE RESPONSE
Filed Aug. 31, 1964

INVENTOR.
RICHARD W. FREYTAG

BY
ATTORNEY

# United States Patent Office 3,364,474
Patented Jan. 16, 1968

3,364,474
FERROACOUSTIC MEMORY DELAY LINE EMPLOYING REFLECTED STRAIN WAVES FOR IMPROVED SIGNAL-TO-NOISE RESPONSE
Richard W. Freytag, Fairport, N.Y., assignor to General Dynamics Corporation, a corporation of Delaware
Filed Aug. 31, 1964, Ser. No. 393,291
9 Claims. (Cl. 340—173)

ABSTRACT OF THE DISCLOSURE

A ferroacoustic information storage apparatus is described wherein the coincident application of a stress and field changes the property of a line at the coincident location so that data can be written at that location. The apparatus includes a transducer centrally disposed between the ends of the line for straining the line so that reflected stress waves are re-inforced thereby aiding in reducing the signal to noise ratio during reading out from the line.

This invention relates to information handling apparatus and particularly to a memory for storing digital data.

The invention is especially suitable for use in apparatus described in application for Letters Patent Ser. No. 184,426, filed by Joseph W. Gratian on Apr. 2, 1962, and now abandoned, and assigned to the same assignee as this application.

The apparatus described in the Gratian application includes a line of magnetic material having the characteristic of changing its ability to be magnetized in the presence of stress. The line is associated with means for its magnetization. Magnetostrictive material, for example, in the form of a tube may provide the line and a conductor extending along the center of the tube may provide the magnetizing means. A transducer is coupled to the line for generating stress pulses which propagate along the line. To write, a stress pulse is propagated along the line. After a delay which determines the point on the line reached by the stress pulse, a short current pulse is applied to the central conductor. Due to the coincident application of the magnetic field and mechanical stress at the same point on the line, the remanence of the line is enhanced, and the line is magnetized at the point. The magnetized point may represent a stored data element such as a bit, and the location of the point is the address of that bit. To read, a stress pulse is again propagated along the line. After a delay, corresponding to the address of the bit, a gate coupled to the central conductor is enabled momentarily. An electrical pulse representing the bit is induced in the conductor and read out through the gate. In other words, readout results from the movement of the stress pulse between line increments of different strain sensitivity respectively representing an unrecorded line portion and the recorded bit. By strain sensitivity is meant the change in induction or flux density which results from a change in stress in the line material. The memory apparatus described above is termed a "ferroacoustic" memory.

The signal-to-noise ratio of the readout signal depends in part upon the magnitude of the stresses used in writing on and reading from the storage line. The line material and the line dimensions may not be entirely uniform. The readout signal resulting from the passage of a readout stress pulse may include a noise component due to such line non-uniformities. However, when data is recorded with a sufficiently high magnitude stress pulse, the stored data is represented by much higher levels of magnetization than the noise components. The readout voltage resulting from the passage along the line of a sufficiently high magnitude readout stress pulse also has a high signal-to-noise ratio.

Sufficiently high magnitude readout stress pulses may be obtained through the use of efficient electromechanical line driving transducers and high transducer driving currents. It is especially advantageous in the case of a magnetostrictive storage line to use a magnetostrictive transducer, for example as may be provided by simply winding a coil around a section of the magnetostrictive line. In addition to their simplicity magnetostrictive transducers may be used with magnetostrictive lines without special means for coupling or bonding them to the line.

Accordingly, it is an object of the present invention to provide improved information storage apparatus.

It is a further object of the invention to provide an improved ferroacoustic memory.

It is a still further object of the invention to provide an improved ferroacoustic memory which provides readout signals having an improved signal-to-noise ratio.

It is a still further object of the present invention to provide an improved ferroacoustic memory which utilizes a magnetostrictive transducer in a manner to provide improved signal-to-noise ratio in the readout signal therefrom.

It is a still further object of the present invention to provide an improved ferroacoustic information storage system wherein the timing of readout and writing is accurately and simply controlled.

Briefly described, information storage apparatus embodying the invention includes a line having the characteristics of changing its ability to store signals in the presence of stress. An element for carrying such signals is linked to the line. A transducer for generating stress pulses which propagate along the line is disposed between the ends of the line, at the center thereof means are provided for operating the transducer when stress pulses, which are propagated to the ends of the line and are reflected back to the transducer, arrive at the transducer so as to reinforce such reflected pulses. The stress pulses may be continually reinforced until the acoustic attenuation in the line equals the gain in stress pulse magnitude per reinforcement cycle so as to maximize the stress pulse magnitude. The magnitude of the stress pulses propagated along the line is therefore considerably increased after several cycles of reinforcement. Means are provided for applying signals to the signal carrying element in timed relation to the stress pulses for writing on the line, and for reading signals written upon the line from the element.

The apparatus provided by the invention may be termed "a resonant information storage device," since the period of the exciting stimulus (the transducer current, for example) is integrally related to the natural period of propagation of the stress pulses between the ends of the line.

The invention itself, both as to its organization and method of operation, as well as additional objects and advantages thereof will become more readily apparent from a reading of the following description in connection with the accompanying drawings in which.

Figure 1:
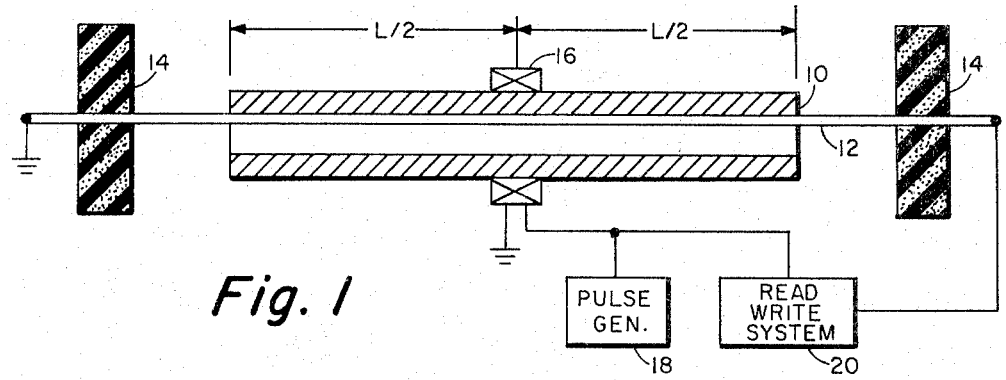
FIG. 1 is an enlarged diagrammatic view, partially in block form, of an information storage apparatus embodying the invention.

Referring more particularly to FIG. 1, there is shown a ferroacoustic memory including an information storage line 10 of material, the permeability of which is a function of the stress which is applied thereto. The line is in the form of a tube of magnetostrictive material such as a nickel-iron alloy containing about one-half nickel and the rest iron. The view is greatly enlarged. While the line may be two to three feet in length, its outside diameter may be 0.015 inch and its wall thickness may be 0.002 inch. An element which is adapted to carry current, such as a wire conductor 12 coated with insulating material, is threaded through the center of the tubular line 10. The conductor 12 may be held tautly between blocks 14 of sponge rubber or other vibration absorbing material. The line 10 is supported on the conductor, accordingly, the line 10 is not damped acoustically. A coil 16 is wound around a small section, say 0.1 inch long, of the line 10 exactly at the center thereof. Since the line 10 is magnetostrictive, this coil 16 and the section of the line 10 directly under the coil define a magneto strictive transducer. It may be desirable to use other electromechanical transducers, such as piezoelectric transducers. A pulse generator 18 is coupled to the line for applying current pulses, illustrated by the waveform (a) of FIG. 3, to the coil 16. The pulse generator is also coupled to a read-write system 20, which system is connected to the conductor 12. The pulses from the generator may be used to control the transfer of information with respect to the line by writing in or reading out data therefrom. This data may be in the form of binary bits. A magnetized increment of the line 10 may represent a binary "one" bit, while an unmagnetized line 10 increment may represent the binary "0" bit.

In order to write information into the line 10 a pulse of current is applied to the conductor 12, in timed relation to the generation of a stress pulse by the transducer defined by the coil 16. A magnetizing field is then established in the line 10 at the time when a mechanical pulse propagated by the transducer reaches a point on the line 10 corresponding to the address of the data. The line 10 is strongly magnetized at that address and retains its magnetization after the termination of the mechanical pulse and the field. In order to record or store the data bit, it is desirable that the stress pulse be of large amplitude.

Figure 2:
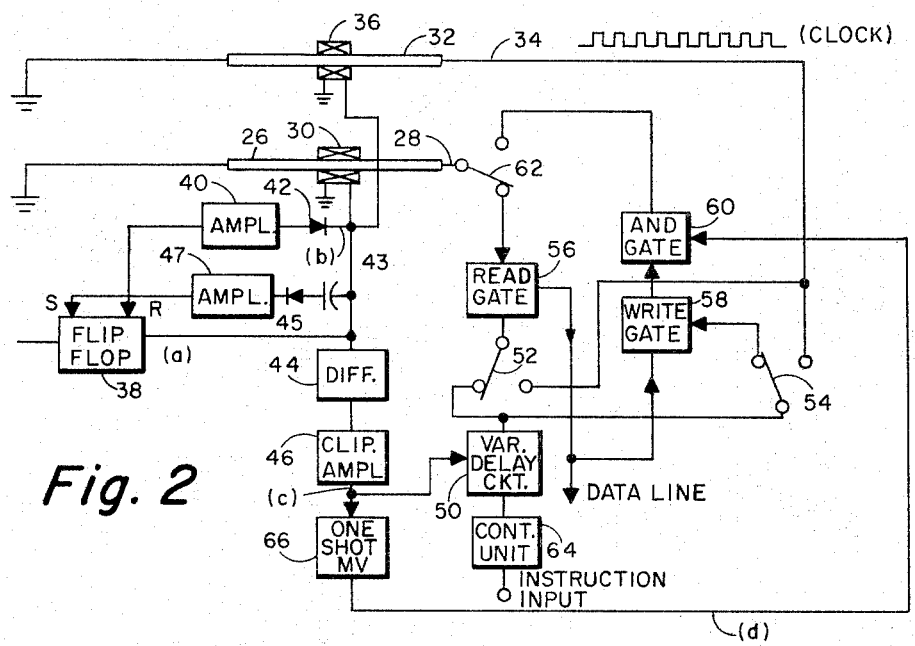
FIG. 2 is a block diagram of an information storage system, embodying the invention and utilizing the information storage apparatus illustrated in FIG. 1.

It will be noted that the transducer defined by the coil 16 is disposed at the center of the line. Accordingly, the distance from the center of the coil to the ends of the line 10 is L/2, where L is the length of the line. Accordingly, the application of a step-current input to the coil, as is the case when the current pulse shown in waveform (a) of FIG. 2 is applied thereto, causes a unidirectional stress pulse (compressive for the nickel-iron alloy mentioned above) to propagate along each half of the line 10. These pulses are reflected from the free end of the line 10 as tensile stress pulses, and at some later time are merged directly within the section of the line 10 under the coil 16. At this instant of merger the current pulse terminates. In accordance with the characteristics of magnetostrictive transducers, when these transducers are energized, they produce a longitudinal extension of the magnetostrictive material associated therewith; whereas, when the current through the transducer terminates, the magnetostrictive material contracts longitudinally. Accordingly, when the current pulse which passes through the coil 16 terminates, a tensile stress pulse is generated. This tensile stress pulse reinforces the reflected tensile stress pulses as they pass through the section of the line under the coil 16.

Figure 3:
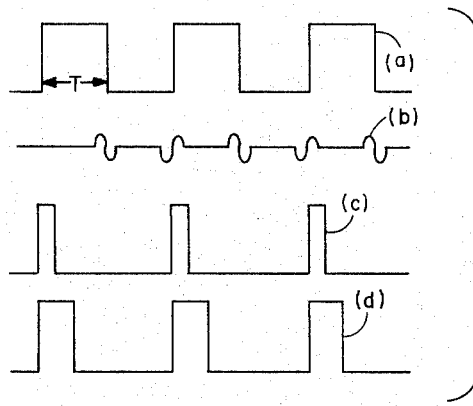
FIG. 3 is a series of waveforms of signals which appear in the system of FIG. 2.

The process of reflection and reinforcement is continued. The tensile and compressive stress pulses are alternatively reinformed at the onset and termination of each current pulse. The magnitude of the stress pulses which propagate through the line 10 is therefore greatly amplified. The magnitude of these pulses is limited by the acoustic attenuation in the line 10. In other words, during the initial cycles of the current pulse train which is applied to the coil 16, the amplitude of the stress pulses increase until the acoustic attenuation balances the gain in stress magnitude per cycle. Accordingly, a pulse train applied at the frequency for resonant propagation of stress pulses generates a continuously circulating, high level stress pulse after an initial build-up of several current pulse repetitions. The duration of these current pulses indicated as T in waveform (a) of FIG. 3, is related to the velocity of sound acoustic propagation V in the line 10 material, and the length of the line. Since the transducer is at the mid point of the line 10, this duration T should equal the length of the line 10 divided by the velocity of propagation, i.e., $T=L/V$. The frequency or repetition rate $f$ will equal twice the velocity of propagation of the acoustic waves in the line 10 divided by the length of the line; that is, $$f=V/2L$$

FIG. 2 illustrates a system for reading and writing information onto a storage line 26 similar to the line 10 shown in FIG. 1. This line 26 also has a conductor 28 extended along the axis thereof and a coil 30 which defines a magnetostrictive transducer around a section of the line 10 at the center thereof. A similar storage line 32 including a conductor 34 and a coil 36 is also included in the system.

The pulse generator for energizing these coils so as to cause them to propagate the stress pulses, includes a flip-flop 38. The flip-flop may be a known design and includes an input set and reset terminals and a trigger terminal respectively, indicated as S, R, and T. The output of a flip-flop is indicated as "1." The "0" output of the flip-flop is not used. The output of the flip-flop is connected to both coils 30 and 36. The reset and set terminals are connected respectively to the outputs of an amplifier 40 and an inverting amplifier 47. A clipping diode 42 and another clipping diode 45, which are oppositely polarized, are respectively connected to the inputs of the amplifiers 40 and 47. The diodes are connected to the coils 30 and 36; the diode 45 through a blocking capacitor 43.

The pulse generator serves to set up the resonant propagation of stress pulses in the lines 26 and 32. Waveform (a) indicates the output current wave of duration T and frequency $f$ which is applied to the coils 30 and 36. The duration and frequency of this current wave is determined by the period of transmission and reflection of the stress pulses along the lines 26 and 32.

In operation, the flip-flop 38 is triggered by applying a trigger pulse by its trigger input T. This sets the flip-flop and a step of current is applied to the coils 30 and 36. Compressive stress pulses are transmitted to the ends of lines 26 and 32 and are reflected as tensile stress pulses. When these tensile stress pulses reach the coils 30 and 36, they induce voltages therein by the Villare effect (reverse magnetostriction). These pulses are indicated in waveform (b) in FIG. 3. For example, the pulses may be positive in polarity until they merge at the center of the coils 30 and 36. As the pulses merge they produce a negative going transient voltage. Accordingly, this indicative, negative going transient voltage occurs exactly when the tensile pulses are within the area of the lines 26 and 32 encompassed by the coils 30 and 36. It is at this time when these tensile pulses may be reinforced. Accordingly, the negative going portions of the voltage induced in the coils 30 and 36 is clipped by the diode 42, amplified in the amplifier 40 and used to reset the flip-flop 38. Accordingly the current pulse terminates. The termination to this current pulse produces a tensile stress pulse reinforcing the reflected tensile stress pulses, as was explained above. The process is repeated for the reflected compressive stress pulses. However these reflected compressive pulses induce voltages which are first negative and then positive going. The positive going transient voltage is indicative of the moment when reinforcement is desired. Accordingly the positive going voltage passes through the capacitor 43 and the diode 45 and is inverted in the amplifier to negative polarity for setting the flip-flop 38. A current is then applied to the coils and produces a compressive stress pulse. The diode 42 and capacitor 43 prevent untimely setting or resetting of the flip-flop 38. The operation repeats cyclically for reflected tensile and compressive stress pulses. Accordingly, the resonant lines 26 and 32 are inherently self-clocking.

The pulses produced by the flip-flop pulse generator may be used to control the writing and reading of information in and from the line 26. A differentiating circuit 44 and a clipping amplifier circuit 46 derive, from the leading edge of the current pulse (a), FIG. 3, a trigger pulse (c) which is applied to a variable delay circuit 50. This variable delay circuit maybe monostable multivibrator which provides an output pulse, the leading or lagging edge of which may be shifted in time. The pulse (c) after a delay in the circuit 50 is applied through switches 52 and 54, to a read gate 56 and a write gate 58. An AND gate 60 is input connected to the output of the write gate. The output of this AND gate 60 is connected through a read-write switch 62 to the conductor 28 of the line 26. The read and write gates 56 and 58 may also be AND gates.

A control unit 64, operated by the instruction portion of the data, is connected to the circuit 50 for adjusting the delay provided by the circuit in correspondence with the address for the data in the line 26. The control unit may, for example be a digital to analog converter which converts the instruction code representing the address to a voltage which varies the delay in the delay circuit 50. This delay may correspond to the time of propagation of a compressive pulse (note that the pulse applied to the delay circuit corresponds to the leading edge of the current wave which generates the compressive stress pulse), to a point on the line 26 corresponding to the address of the data. The read gate or the write gate is then enabled so that a data line may be connected to the conductor 28. When the switch 62 is in the read position, the data line is connected to the conductor 28 in coincidence with the arrival of the stress pulse at the address for the data to be read out of the line. Similarly, the data line is connected through the write gate and through the AND gate 60 to the conductor 28 so that the signals representing the data may be stored at the proper address at the line 26.

A one-shot multivibrator 66 is connected to the output of the clipping amplifier and is triggered by the pulse train illustrated in waveform (c) of FIG. 3 to provide a train of pulses indicated by waveform (d) of FIG. 3. These pulses have a duration equal to half the duration T of the current pulses produced at the output of the flip-flop 38 and shown in waveform (a). Accordingly, the AND gate 60 to which the output of the multivibrator 66 is connected is enabled for an interval of time equal to the time of propagation of the compressive pulses from the center of the line to the ends thereof. Accordingly, recording by means of the tensile stress pulses is prevented. It will be appreciated that for certain materials it is desirable to record through the use of the tensile pulses, in such case other timing circuits known in the art may be used to provide for recording during a period equal to the half of the period of the pulse train starting from the termination of the current pulse, i.e., when the flip-flop 30 is reset.

The line 32 is used to provide a train of clock pulses for controlling the writing in or reading out of data. These clock pulses may be used alternatively to the pulses from the delay circuit 50. Accordingly, the switches 52 or 54 condition the system for timing either by the clock pulses or by the pulses from the delay circuit 50. The clock pulses may be pre-recorded on the line 30 when a compressive pulse is propagated along the line 32. These clock pulses are read out and applied, through the switch 54 and 52 to the read and write gates. Accordingly, the read and write gates are enabled during the period of these clock pulses. The line 32 is analogous to a clock track on a magnetic drum which provides clock signals for controlling magnetic recording and reproduction of signals on other tracks on that drum.

From the foregoing description it will be appreciated that there has been provided an improved information storage apparatus and an improved system for information storage. It will be appreciated that variations and modifications of the apparatus and system within the scope of the invention, will, undoubtedly, become apparent to those skilled in the art. For example, only one-half of the lines 26 and 32 are utilized in the system illustrated in FIG. 2. By duplication of the read-write logic, signals may be stored in the other half of these lines. The conductors 28 and 34 may then be grounded at their midpoints. In some cases where data is to be written or read intermittently it may be desirable to condition the pulse generator flip-flop to provide a short train of pulses instead of a continuous pulse train. The later operation may be considered as partial resonance, since stress pulse magnitudes may not be as high as in complete resonant operation. Accordingly, the foregoing description may be taken merely as illustrative and not in any limiting sense.

What is claimed is:

1. Information storage apparatus for storing and reading out data comprising a line of retentive material having an information retention characteristic which is a function of stress and field coincidentally applied thereto, means coupled to said line for propagating a stress pulse from the center thereof towards the ends thereof, means for operating said propagating means to propagate successive stress pulses coincident with the arrival at said propagating means of stress pulses reflected from the ends of said line so as to reinforce said reflected pulses, and means for writing information into and reading information out of said line in timed relation to the operation of said propagating means comprising means for applying a field coincidentally with a stress pulse for storing data in a predetermined increment of said line and means for reading out said stored data in response to a stress pulse propagating through said increment.

2. Ferroacoustic information storage apparatus for storing and reading out data comprising a line of magnetic material having a magnetization characteristic which is a function of stress and field coincidentally applied thereto, an element for carrying a current magnetically linked to said line, transducer means centrally disposed between the ends of said line for straining a central increment in said line selectively in opposite senses, means for operating said transducer to strain said line alternately in opposite senses periodically at intervals equal to the time of propagation of a stress pulse from said central increment, to an end of said line and back to said central increment, and means coupled to said element for transferring inforamtion with respect to said line comprising means for applying a field coincidentally with a stress pulse for storing data in a predetermined increment of said line and means for reading out said stored data in response to a press pulse propagating through said increment.

3. Ferroacoustic information storage apparatus for storing and reading out data comprising a line of magnetostrictive material having a remanence characteristic which is a function of stress and field coincidentally applied thereto, a current carrying element magnetically linked to said line along the length thereof, means including a coil disposed around a section of said line located centrally between the ends thereof defining a magnetostrictive transducer, means for passing a train of current pulses through said coil, said pulses having a duration equal to the ratio of the length of said line to the velocity of acoustic wave propagation along said line and having a frequency equal to the velocity of acoustic wave propagation in said line divided by twice the length of said line, and means connected to said element for transferring information with respect to said line in timed relation to said current pulses comprising means for applying a field coincidentally with a stress pulse for storing data in a predetermined increment of said line and means for reading out said stored data in response to a stress pulse propagating through said increment.

4. The invention as set forth in claim 3 wherein said element is a conductor, wherein said line is a tube through which said conductor extends, and wherein means are provided for supporting said conductor such that the ends of said line are free.

5. An information storage system for storing and reading out data comprising a line of stress sensitive material having a remanent characteristic which is a function of stress and coincident field applied thereto, electromechanical transducer means disposed at the center of said line for propagating stress pulses along said line, which pulses are reflected from the ends of said line, means responsive to an electrical signal generated by said transducer due to each said reflected stress pulse for operating said transducer to stress said line in a direction to reinforce said reflected stress pulse, and means for transferring information with respect to said line comprising means for applying a field coincidentally with a stress pulse for storing data in a predetermined increment of said line and means for reading out said stored data in response to a stress pulse propagating through said increment.

6. Information storage apparatus and field coincidentally comprising a line of magnetostrictive material the remanence of which is a function of applied stress and coincidentally applied field, a coil disposed around a section of said line at the center thereof, a triggerable pulse generator having its input and output both coupled to said coil for providing a square wave of output current to said coil, the edges of which wave occurring when said generator is triggered, and a current carrying element linked to said coil and operated in timed relation to said current wave comprising means for applying a field coincidentally with a stress pulse for storing data in a predetermined increment of said line and means for reading out said stored data in response to a stress pulse propagating through said increment.

7. An information storage system comprising a line of magnetostrictive material having a remanence which is a function of applied stress, a coil disposed around a section of said line at the center thereof, a conductor magnetically linked to said line, a flip-flop having set and reset inputs and an output, means for coupling said coil to said flip-flop output and to said flip-flop inputs, and means for writing information on said line and reading information from said line coupled to said conductor.

8. An information storage system comprising a plurality of lines of material having retentivity for signals which is a function of stress applied thereto, said lines each having a separate transducer operable for propagating stress pulses therealong said lines also having separate current carrying elements linked thereto, means for simultaneously operating said transducers, one of said lines having a train of signals stored therein; and means responsive to signals readout of said one line element coupled to said elements of the others of said plurality lines for timing the transfer of information with respect to said others of said plurality of lines.

9. An information storage system comprising a plurality of lines of magnetostrictive material each having a remanence characteristic which is a function of applied stress, a plurality of transducers each around a different one of said lines at the centers thereof, a plurality of conductors each linked to a different one of said lines, pulse generating means for applying a train of current pulses to operate all of said transducers simultaneously for establishing resonant operation of said lines, on of said plurality of lines having a train of clock pulses stored therein, gate circuits connected to the conductors of the others of said plurality of lines for writing in and reading out information, and said one line conductor being coupled to said gate circuits for enabling and inhibiting said gate circuits in accordance with said clock pulses.

References Cited
UNITED STATES PATENTS

| | | | |
|---|---|---|---|
| 2,612,603 | 9/1952 | Nicholson | 340—173 |
| 3,016,524 | 1/1962 | Edmunds | 340—173 |
| 3,320,596 | 5/1967 | Smith et al. | 340—173 X |

BERNARD KONICK, *Primary Examiner.*

J. F. BREIMAYER, *Assistant Examiner.*